United States Patent Office 2,778,849
Patented Jan. 22, 1957

2,778,849

PURIFICATION OF PLASTICIZER ESTERS

Oscar Ackelsberg, Bloomfield, N. J., assignor, by mesne assignments, to William M. Hackman, Watchung, N. J.

No Drawing. Application September 25, 1953,
Serial No. 382,476

10 Claims. (Cl. 260—475)

This invention relates to the purification of di-alkyl esters of dibasic (i. e. dicarboxylic) acids wherein the alkyl group has up to and including twelve carbon atoms. It is especially applicable to such esters useful as plasticizers for synthetic resins and more particularly for resins that are used in sheet or film form. The invention is beneficial in the preparation of such esters for use, for example, as plasticizers especially to rid them of odor, and thereby to make them available significantly highly and practically completely free of odor and various other impurities.

The increased use of sheet resin materials for household articles such as table and food covers and bathroom and other curtains and for coverings such as raincoats has emphasized the need for light and heat stability in them. At the same time, the importance of plasticizers especially highly free of odor and exhibiting marked stability in this respect has become prominently significant.

These di-alkanoyl esters of dibasic (i. e. dicarboxylic) acids, having under thirteen carbon atoms in each alkyl group, are known to be readily synthesized by esterifying the selected dicarboxylic acid or its anhydride with the required amount of the particular aliphatic alcohol in the presence of an acid catalyst and at an elevated temperature and advantageously with the removal of water formed during the reaction. After the esterification, the reaction mixture is treated with an alkaline material to neutralize the acid catalyst and then water-washed. The ester so synthesized then is treated by steps aimed at reducing the quantity of undesirable materials present as impurities in the reaction, such as unreacted starting materials, original impurities in them, and breakdown products.

In general, these di-alkanoyl esters of dicarboxylic acids, and of them particularly the high boiling esters of phthalic acid are especially difficult to prepare in relatively highly pure state. In the esterification step, the resulting ester, for example, one with alkyl groups of higher molecular weight such as higher than the dibutyl esters, and particularly one wherein the alkyl group has at least six carbon atoms, and especially one where that group has from eight to ten carbon atoms, have not responded to removal of the least several percent of impurities by the customary purification procedures. Decomposition products and residual traces of starting alcohols carried along with the ester impart to it undesirable pungent, penetrating and lasting odor that not only gives discomfort to the workers engaged in milling these esters into plastics with which such esters are used as plasticizers, but also stays on in the finished product beyond its purchase by the ultimate user. These and other impurities adversely affect the heat and color stability and flexing properties of the final plastic products.

Various procedures have been tried for ridding the esters so produced of odor-contributing-factors and their other undesirable impurities. However, these methods have been found to be too cumbersome, inefficient, time-consuming, or costly, or have fallen far short of the improvement in the quality of the finished esters or plasticizers that their uses have so long required. Except for molecular distillation, which aside from its undesirably high cost, usually gave yields under 80 percent, the purity of the members of this group of esters, and of the plasticizer esters among them, purified by the procedures available prior to this invention has been somewhere between about 95 and 98.5 percent.

However, a purity of as much as 98.5 percent and even up to 99 percent leaves much to be desired, for the residual one and one-half to one percent and event to one-half percent of impurities still contributed undesirable characteristics and effects in these esters particularly when used as plasticizers.

The lower molecular weight di-alkyl esters, of dicarboxylic acids such as the dimethyl, diethyl, dipropyl, and usually the dibutyl, esters, for example, their phthalates, can readily be produced in relatively highly pure state by the usual methods.

However, these di-alkyl plasticizer esters with the higher molecular weight alkyl groups such as higher than butyl and particularly having at least about six, and especially from eight to ten, carbon atoms in each alkyl group, are not readily obtainable in relatively high purity. Particularly with them the removal of at least the last percent, and especially the last one-half percent and less, of residual impurities is extremely difficult particularly without significant loss in yield.

Thus, for example, the odor removal has been most difficult with diisooctyl, dicapryl, and didecyl plasticizer esters, such as their phthalates, adipates, and sebacates. High temperatures deleteriously affect these esters and particularly so with the dicapryl esters which appear to be the most sensitive of these plasticizer esters to temperature.

These various disadvantages and shortcomings of prior methods are strikingly overcome and avoided by the processing improvements involved in the invention covered herein, which regularly give purities significantly well over 99 percent and consistently over 99.5 percent, and usually 99.8 percent and often 99.8 to 99.9 percent.

Considered broadly, the process of the invention involves the significant step of subjecting these di-alkyl esters of dibasic (i. e. dicarboxylic) acids to a simultaneous vacuum, heat and steam treatment, after the water-washing following the neutralization of any acid, or acidic substance used, for example, as the esterification agent, or developed in the esterification of the selected dicarboxylic acid with the particular aliphatic alcohol or alcohols used. Broadly, the simultaneous treatment involves subjecting the ester to a sufficiently high vacuum under about one hundred millimeters of mercury while maintaining the ester at a temperature of at least in the neighborhood of 120° C. and under its boiling point and at the same time injecting live steam into the body of ester.

The joint vacuum, heat and steam treatment of the invention is applicable generally to these di-alkyl esters of dicarboxylic acids whether the ester groups are the same or different in the individual di-ester. It is especially beneficial in the purification and accompanying deodorization of the high boiling di-alkyl esters of mononuclear aromatic dicarboxylic acids particularly such as those of phathalic acid, as well as of the aliphatic dibasic acids such as sebacic and adipic acids, having no more than twelve carbon atoms in each alkyl group. The joint vacuum, heat and steam treatment of the invention is prominently beneficial in the purification of the di-esters prepared from aliphatic alcohols having four to ten carbon atoms, and particularly those having at least about six carbon atoms, and especially those with from eight to ten carbon atoms.

Ordinarily, it is advantageous that the simultaneous vacuum steam treatment according to the invention be conducted by maintaining the esters at a temperature under the boiling point of the ester under the vacuum used and below that at which the ester, or its purification is adversely affected, or usually not exceeding about 160° C. Generally outstanding results follow by not exceeding 135° and then by operation within the range of about 120 to 130° and especially at about 125°. Thus, for example, with dibutylphthalate the joint vacuum steam treatment can be carried out at 150° with satisfactory results. In general, however, it is better to avoid going so high with it and preferable not to exceed 135°. Also with didecylphthalate the temperature of the vacuum stream treatment can approach 150° and at best should not exceed it, and operation is most effective at between about 125° and 135°. The vacuum steam treatment with dicaprylphthalate and with diisooctylphthalate ought not to exceed 135°, although it is advantageous to run it between about 125° and about 130°. All temperatures herein and in the appended claims are in centigrade.

With some di-alkyl esters when the simultaneous vacuum steam treatment is carried out about 135°, occasionally decomposition products result and the undesirable odor imparted to the product cannot entirely be completely eliminated. Often in such cases the free acidity of the finished product is increased. Accordingly, with such di-esters, operating the joint vacuum steam treatment at no higher than, and preferably below, 135° eliminates these undesirable features and also avoids discoloring the product and/or breakdown of the ester followed by distilling over phthalic anhydride which would clog the condenser and the lines leading from it. In any event, with these various di-esters, this vacuum steam treatment can always be carried out at at least about 120°.

The temperature of the body of ester being treated is maintained within the ranges, and at the various levels, indicated advantageously by indirect heat exchange such as by a heating jacket or more effectively by heating coils submerged in the body of ester. Although it is possible also to do so jointly with, or solely by, the steam injected into the ester as part of its simultaneous treatment.

The unusual results contributed by the invention are obtained particularly by operating at a reduced pressure preferably no higher than about one hundred millimeters of mercury absolute. It is especially advantageous to operate at pressures under that and no higher than about fifty millimeters, and exceptionally beneficial to operate as low as about six millimeters of mercury. Consistently good results are obtained by operating at between about fifteen and about thirty millimeters of mercury. With some of the di-esters, if the pressure during the vacuum, heat and steam treatment exceeds about fifty millimeters of mercury, decomposition products may result and undesirable odor be imparted that cannot be removed completely, and the free acidity of the finished product may be increased. All pressures herein are absolute.

With such di-alkyl esters, keeping the pressure from exceeding, and preferably under, about fifty millimeters of mercury will avoid such decomposition and odor and free acid increase as well as discoloring of the final product and distilling over of phthalic acid anhydride. Generally, the vacuum applied equals the sum of the partial pressures of the steam and of the various impurities contained by the ester and at the operating temperature.

Since wet steam in some cases may partially hydrolyze the di-ester, it is advantageous to use dry steam for the joint vacuum, heat and steam treatment. Ordinarily, the pressure of the steam injected into the body of ester, maintained under vacuum and at its elevated temperature, is not essentially critical. Pressures as low as ten pounds per square inch (p. s. i.) are useful. Somewhat lower can be used if necessary. Desirably satisfactory results are obtained by using pressures at least about one hundred p. s. i. Quite efficient operation is obtained at one hundred and twenty-five p. s. i. although the pressures used can be several hundred p. s. i., for example, four hundred and fifty p. s. i. The higher the pressure the better as it more favorably influences the flushing of the body of ester being treated, with concomitant effect on the production rate.

The duration of the joint treatment depends on the initial percentage of impurities in the individual ester being treated, the temperature at which it is maintained, the pressure and feed rate of the steam injected, and the final purity to be attained. The higher the steam pressure and rate, the higher the vacuum applied and the temperature of the body of ester, the shorter the duration of the treatment. The progress of the reduction in percentage impurities can be followed by tapping test samples from a suitable outlet in the vessel holding the body of ester. The specific gravity, freedom from odor determined merely by smelling, and freedom from acidity exemplify the quick control tests that can be made and indicate that the treatment can be terminated.

The time ordinarily is shorter the lower the number of carbon atoms in the alkyl group. Generally also, a comparatively lower quantity of steam needs to be injected the lower the number of carbons in the alkyl group, all other conditions being equal.

The invention is illustrated by, but not restricted to, the following examples:

Example 1

Di-isooctylphthalate is prepared by esterification between a minimum of two moles of isooctanol and one mole of phthalic anhydride (or phthalic acid) at elevated temperature in the presence of sulfuric acid, followed by adding sufficient aqueous sodium carbonate solution to neutralize the free acid and washing the ester with water until it is sufficiently free of the products of the neutralization. The di-isooctylphthalate is transferred to a closed process vessel (equipped with heating coil, perforated steam injection tubing, and for vacuum). The vacuum is then applied to reduce, and hold, the pressure at twenty millimeters of mercury, heat being applied, directly after the vacuum is attained, to raise the temperature of the ester to, and maintain it at, 125°, and dry, live steam is injected, while the ester is being heated, and continued simultaneously with the maintenance of the subatmospheric pressure and the elevated temperature until a test sample shows freedom from odor and acidity. The steam injection and heating are then discontinued, the vacuum released and the batch of ester allowed to cool. The cool ester shows a purity of 99.6 percent.

Example 2

In the treatment vessel described in Example 1, vacuum was applied over 20,000 pounds of dicapryl phthalate to reach a pressure of fifty millimeters of mercury. The body of ester was then heated by indirect heat exchange to raise its temperature to 125°. When that temperature was reached, it and the fifty millimeter pressure were maintained while dry, clean steam was injected through the perforated steam injection coil at the bottom of the vessel, until a total of two thousand pounds was injected.

Then a sample of the treated ester withdrawn for control test showed freedom from odor, and from acidity, the proper specific gravity, and freedom from excess color. The batch was then considered finished, and the injection of steam, indirect heating, and vacuum were discontinued; and the ester cooled. Its purity was 99.7%.

Example 3

In the same treatment vessel, and proceeding, as in Example 2, a vacuum of seventy-five millimeters of mercury was drawn on 20,000 pounds of dibutyl phthalate and its temperature raised to 135°. When that temperature was reached, it and that subatmospheric pressure were maintained while seventy-five pounds of dry, live steam were injected. By that time control samples indicated that the ester had been brought to a satisfactory purity. The joint vacuum, heat and steam treatment was then discontinued and the ester cooled. Purity was 99.8 percent.

*Example 4*

A batch of ten tons of didecylphthalate was processed in the same manner as with the esters in the preceding examples, except that the vacuum applied and maintained was forty millimeters of mercury and the temperature was maintained at 150°, and one thousand pounds of clean, dry steam were injected. The purity of the finished product was 99.7 percent.

Some modification is possible in the processing. Generally, it is preferable, as was shown in the examples, to begin by drawing the vacuum to the desired subatmospheric pressure. That first removes air from the vessel, and then the water comes off from the ester wet from the water-wash following the acid neutralization. Any excess unesterified acid then comes off and also other impurities, depending on their relative vapor pressures and partial pressures as the vacuum is maintained and the heat is applied and the steam is being injected.

It is also possible to begin with the heating to raise the ester to the operating temperature and to apply the vacuum while the temperature is being raised and then to inject the live steam. It is likewise possible to begin the injection of the live steam while the vacuum is being drawn, and to start heating the batch either before, or when, the selected operating subatmospheric pressure is attained. Generally, it is preferable to avoid injecting the live steam before the drawing of the vacuum or heating of the batch has been started. However, the steam can be injected first so long as it is for a relatively limited, short time before it can deleteriously affect the ester, for example, by hydrolyzing it, or convert some impurity into a product more difficult to remove by the simultaneous vacuum, heat and steam treatment.

The simultaneous treatment is applied to the ester to be purified until the desired degree of purity, within the above indicated attainable range, or until an economically practical degree, within that range, is reached. As little as ten minutes can be sufficient under the higher operating conditions for esters with the smaller number of carbon atoms in the alkyl groups. Others having the higher number of carbons in that group can be purified to within the indicated range within about one-half hour especially when treated under the higher operating conditions. Under some conditions some more time may be needed.

The simultaneous vacuum, heat and steam treatment of the invention provides an advantageously high production rate by its rapid throughput by virtue of the unusual ready volatility of the various impurities, made possible by the combined application of the vacuum, heat, and steam injection.

In any of the examples, the di-alkyl phthalate can be replaced by any other of the di-alkyl esters of the dicarboxylic acids concerned having under thirteen carbon atoms in the alkyl group. Thus, there can be treated any of the others named above or such others as di(normal)octylphthalate, di(2 - ethylhexyl)phthalate, octyl decylphthalate, dibutylsebacate, dioctylsebacate, di(2-ethylhexyl) sebacate, octyl decyl sebacate, or dibutyladipate, di(normal)octyl adipate, di(2-ethylhexyl)adipate, octyl decyl adipate, or any other such di-alkyl ester of a dicarboxylic acid of the type involved herein, particularly such that are suitable as plasticizers especially in sheet polymers. These various esters that can be treated by the method of the invention generally are liquid and stable at a temperature between about one hundred and about one hundred and sixty degrees.

While in the treatment, acceptable results follow when the heating is maintained at at least one hundred degrees, the operation is advantageously more effective when the heating is maintained at a minimum of about one hundred and twenty degrees.

It is desirable that leakage of air into the vacuum, heat and steam treatment system be reduced to a minimum and preferably eliminated to the greatest extent practically feasible. Otherwise, excessive air leakage during the combined treatment may cause some discolorization and decomposition in the di-ester.

When properly followed, the method of the invention will regularly give a finished di-alkyl ester of a dibasic acid with a purity greatly exceeding 99 percent and consistently over 99.6 percent, and commonly at 99.8 percent, and often 99.8 to 99.9 percent.

Before or, if necessary, after the simultaneous treatment of the invention, the ester may be given any of the commonly used, economically effective decolorizing treatments.

One using as a plasticizer in vinyl polymer sheet material a di-alkanoyl ester of a dicarboxylic acid purified by the simultaneous, vacuum, heat and steam procedure of the invention can be assured of color stability and be able to match the plasticized sheets prepared by using plasticizer obtained from successive batches. The finished sheet material is free of odor, and shows higher heat and light stability in accelerated tests, as well as in production lots, improved dielectric properties, and will stand up longer in flexing tests than corresponding sheets prepared using as plasticizer the same ester but without its having been purified by the method of this invention. The purification of the plasticizer esters by the improvement of the invention develops retention of flexibility. Finished sheets plasticized with a di-ester purified by the method of the invention also show lower lacquer lift, are practically completely free from causing calendar mist on curing and thus avoid the undesirable spotting heretofore experienced.

While the invention has been described in relation to certain specific embodiments of it, it is understood that various modifications and substitutions can be made in them within the scope of the appending claims which are intended to cover also equivalents of the illustrative examples.

What is claimed is:

1. The process of deodorizing and purifying di-alkyl esters of organic dicarboxylic acids having up to and including twelve carbon atoms in the alkyl group, and to a purity between about ninety-nine and one hundred percent, which esters are liquid and stable at a temperature between about one hundred and about one hundred and sixty degrees, which method comprises maintaining such ester at a temperature from about one hundred degrees to any higher temperature below that at which the ester is adversely affected, while subjecting such ester to subatmospheric pressure within the range of about one hundred millimeters of mercury and less and simultaneously injecting live steam into the body of liquid ester and in a quantity and for a time sufficient for it to reach the desired purity within the above recited range.

2. The process as claimed in claim 1, wherein the ester is liquid and is brought to the operating subatmospheric pressure before having its temperature raised to the level at which it is to be maintained and before the steam is injected into it.

3. The process as claimed in claim 2, wherein the ester is elevated to the temperature at which it is to be maintained, before the steam is injected.

4. The process as claimed in claim 1, wherein the steam is injected into the ester upon its reaching the subatmospheric temperature at which it is to be held, and while it is at an elevated temperature.

5. The process as claimed in claim 1, wherein the temperature of the ester is elevated before it is subjected to subatmospheric pressure and before the steam is injected into it.

6. The process as claimed in claim 1, wherein the steam injected into the ester is dry.

7. The process as claimed in claim 1, wherein the temperature at which the ester is maintained is below about one hundred and sixty degrees.

8. The process as claimed in claim 1, wherein the ester is maintained at a temperature between about one hundred and twenty and one hundred and sixty degrees.

9. The process as claimed in claim 7, wherein the esters treated are the type that can be used as plasticizers for plastics.

10. The process as claimed in claim 7, wherein the ester is a member of the class consisting of dibutylphthalate, dicaprylphthalate, diisooctylphthalate, di(normal-octyl)phthalate, di(2-ethylhexyl)phthalate, octyl decyl phthalate, dibutylsebacate, dicaprylsebacate, diisooctylsebacate, di(normal-octyl)sebacate, di(2-ethylhexyl) sebacate, octyl decyl sebacate, dibutyl adipate, dicapryl adipate, diisooctyl adipate, di(normal-octyl)adipate, di(2-ethylhexyl) adipate, and octyl decyl adipate.

References Cited in the file of this patent
UNITED STATES PATENTS

| | | |
|---|---|---|
| 1,993,737 | Graves et al. | Mar. 12, 1935 |
| 1,993,738 | Graves et al. | Mar. 12, 1935 |